United States Patent [19]

Schmid

[11] 4,349,178

[45] Sep. 14, 1982

[54] WIRE BLADES

[75] Inventor: Frederick Schmid, Marblehead, Mass.

[73] Assignee: Crystal Systems Inc., Salem, Mass.

[21] Appl. No.: 174,452

[22] Filed: Aug. 1, 1980

Related U.S. Application Data

[62] Division of Ser. No. 32,251, Apr. 23, 1979, Pat. No. 4,256,079, which is a division of Ser. No. 917,918, Jun. 22, 1978, Pat. No. 4,178,670.

[51] Int. Cl.³ .................... B65H 54/02; B65H 59/02
[52] U.S. Cl. ................... 254/216; 242/25 R; 242/45
[58] Field of Search ................. 254/213–226; 242/158.2, 78, 25 R, 54 R, 45, 18 G

[56] References Cited

U.S. PATENT DOCUMENTS

| | | | |
|---|---|---|---|
| 536,939 | 4/1895 | Schulze | 254/223 X |
| 2,228,710 | 1/1941 | Shaw | 242/45 |
| 2,566,848 | 9/1951 | Morton | 242/45 |
| 2,981,491 | 4/1961 | Eans, Jr. | 242/45 |
| 3,559,900 | 2/1971 | Harada et al. | 242/18 G |
| 3,602,445 | 8/1971 | Nagao et al. | 242/18 G |
| 3,871,591 | 3/1975 | Murata | 242/18 G |
| 4,116,394 | 9/1978 | Smith et al. | 242/25 R |

Primary Examiner—John M. Jillions

[57] ABSTRACT

Making a wire pack in which a plurality of wires of predetermined length extend between a pair of spaced supports by wrapping turns of wire in a helix around a cylindrical roll while maintaining a constant tension on the wire, placing the supports in position adjacent but spaced from each other and extending axially of the roll and clamping the wire to the supports, and then cutting the wire segments extending between the adjacent supports.

12 Claims, 5 Drawing Figures

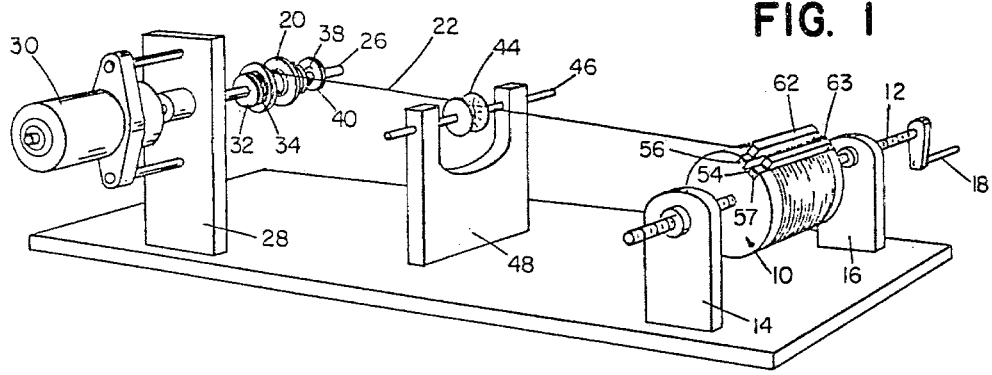
FIG. 1
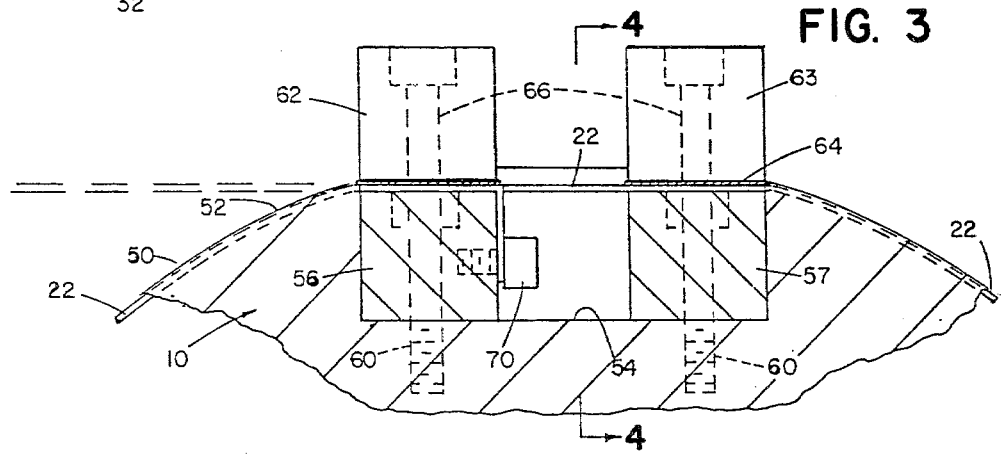
FIG. 2
FIG. 3
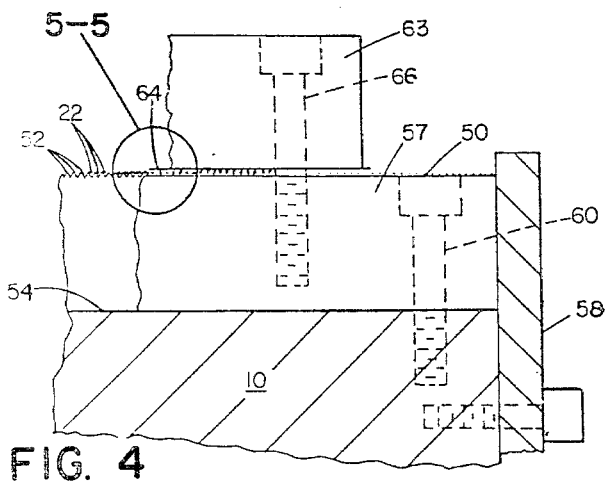
FIG. 4
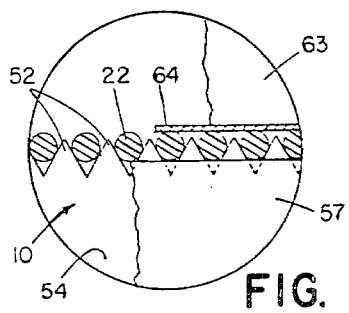
FIG. 5

WIRE BLADES

This is a division of application Ser. No. 32,251, filed Apr. 23, 1979, now U.S. Pat. No. 4,256,079 which itself is a division of application Ser. No. 917,918, filed June 22, 1978 now U.S. Pat. No. 4,178,670, issued Dec. 18, 1979.

FIELD OF THE INVENTION

This invention relates to wire blades for cutting hard materials into wafers.

BACKGROUND OF THE INVENTION

It is desirable to be able simultaneously to cut a number of precisely sized wafers from an ingot of silicon, sapphire, quartz, or similar hard material. Such precision cutting, especially of thin wafers, can best be achieved if the blades are exactly spaced and under the same tension; but that is a difficult goal to achieve, especially with wire blades which easily deflect. U.S. Pat. Nos. 3,079,908, 3,168,087, 3,263,670 and 3,326,071 disclose cutting machines using multiple rectangular blades, and in practice wire blades have been used in corresponding commercially available slicing machines, such as the Model 686 Wafering Machine of Varian Associates, as disclosed in U.S. Pat. No. 4,092,972 which is here incorporated by reference.

SUMMARY OF THE INVENTION

It has been discovered that wire blades can be clamped in a blade pack at equal tension and with equal spacing between each wire if the peak is made by winding wire in a helix around a generally cylindrical roll while maintaining a constant drag on the wire, clamping the wire wrapped on the roll between two sets of clamps extending axially of the roll, and spaced circumferentially from each other, and then cutting the wire portions between the sets of clamps. In the preferred embodiment, the roll is exteriorly threaded (pitch less than 0.02 in.), the roll translates axially a distance equal to its pitch during each roll rotation as the wire is wound onto it, and each set of clamps is mounted in a milled axial slot in the roll periphery.

DESCRIPTION OF THE PREFERRED EMBODIMENT

The drawings show a preferred embodiment of the invention, which is then described. In the drawings:

FIG. 1 is a perspective, somewhat simplified, view of preferred wire pack winding apparatus;

FIG. 2 is a perspective view of the slip clutch and supply spool of the system of FIG. 1;

FIG. 3 is a sectional end view of the roll and wire clamp of the system of FIG. 1;

FIG. 4 is a sectional view taken at 4—4 of FIG. 3; and

FIG. 5 is an enlarged view of a portion of FIG. 4.

Referring now to the drawings, an exteriorly threaded roll 10 is fixed on coaxial threaded shaft 12 which itself is threaded through a pair of spaced supports 14, 16. An offset crank handle 18 is provided at one end of shaft 12. The helical threads of roll 10 and shaft 12 both have the same pitch, 1/64 in., so that the roll will translate axially one thread per revolution of shaft 12.

A spool 20 of wire 22 (copper clad wire having a steel core 0.005 in. in diameter and 0.0015 in. thick cladding) is mounted on a shaft 26 journaled in support 28 parallel to and about 18 in. from shaft 12. A small (1/60 hp.) geared-down electric motor 30 mounted on support 28 drives shaft in counterclockwise (as viewed in FIG. 1) at a speed of about 1 rpm. Spool 20 itself is freely rotatable relative to shaft 26. An adjustable slip assembly couples shaft 26 and spool 20 providing a torque tending to rotate spool (as shown in FIG. 1) counterclockwise. As shown in FIG. 2, the clutch assembly comprises, on each side of spool 20, a pair of discs 32 and a felt clutch pad 34 between and engaging the facing surfaces of each pair of discs. The pair of discs 32 and intermediate pad 34 nearest motor 30 are held axially in place by nuts 36. A helical spring 38 surrounds the shaft on the other side of spool 20 and is forced against the outer one of the other pair of discs 32 by an axially adjustable disc 40 and adjusting nut 42.

Midway between spool 20 and roll 10, a guide pulley 44 is mounted for rotation on a shaft 46, parallel to shafts 12 and 26 and journalled in support 48. Pulley 44 has a V-shaped groove the top of the base of which is positioned slightly above a straight line extending from the top of the wire wound on spool 20 to the top of roll 10. Thus, wire extending from spool 20 over pulley 44 to roll 10 is deflected slightly upwardly, and positively positioned by guide pulley 44.

Referring more particularly to FIGS. 3 and 4, the exterior surface 50 or roll 10 is threaded, 64 threads per inch, along its entire 6 in. length. Each thread 52 has a 60° included angle and a major diameter of 5.204 in. A 1.500 in. wide, 0.500 in. deep at its side edges axial slot 54 is milled into the outside of roll 10. Mounted in slot 54 are two clamp bases 56, 57, each ½ in. wide and about 0.49 in. (as shown in FIGS. 3 and 5, the 0.500 in. slot depth less the distance from the exterior of the roll to the bottom of wire wound in the threads) high and extending the full axial length of roll 10. One end of the slot is closed by a back-up plate 58 which provides a reference permitting the clamp bases to be exactly positioned axially relative to each other. Clamp bases 56, 57 are held in place in slot 54 by cap screws 60, one at each end of each base, extending from counterbores in the clamps into threaded holes in roll 10.

Turns of wire 22 wrapped around roll 10 in threads 52 lie on the flat top surfaces of clamp bases 56, 57 and are clamped in place by clamp tops 62, 63. As shown in FIG. 3., the exact height of the clamps is below the level of the thread grooves so that the transition at the sides of slot 54 as the wires pass between the clamping surfaces and the roll threads is as smooth as possible. A flat, thin strip of deformable metal 64, typically copper, is placed on top of the wire turns on each clamp base 56, 57, between the wire turns and the flat bottom clamping surfaces of clamp tops 62, 63.

As shown, clamp tops 62, 63 are each about ½ in. wide and ¼ high, and are about 1 inch shorter than clamp bases so that cap screws 60 are accessible when the clamp tops are in position on the clamp bases. Cap screws 66, one at each of each clamp top 62, 63, extend through the clamp tops into respective threaded holes in clamp bases 56, 57. When the screws are tightened, the clamp tops are drawn tightly down onto the clamp bases, firmly holding the wires therebetween. The deformable metal strips 64 assure positive gripping.

In operation, clamp bases 56, 57 are bolted in place in slot 54, and crank 18 is then turned (counterclockwise as shown in FIG. 1) until the top of the thread 52 on which winding is to begin lies in a plane perpendicular to the axes of shafts 12 and 46 and passing through the apex of the V-shaped base of pulley 44. Shaft 12 is then locked in place, and wire from spool 20 is fed from it, over pulley 44, into the aligned thread 52, and into slot 54 between clamp bases 56, 57. The end of the wire is there held by a set screw 70 in the side of clamp base 56.

Motor 30 is then actuated, causing shaft 26 to rotate counterclockwise (as shown in FIG. 1) and, through the adjustable slip clutch assembly, exert a counterclockwise (as shown in FIG. 1) torque on spool 20 and a corresponding drag (typically of about one pound) on wire 22. Shaft 12 is then unlocked and the wire, with the drag being exerted on it, is then wound on the spool by turning crank 18 clockwise (as shown in FIG. 1).

When the desired number of wire turns have been wrapped around roll 10, shaft 12 is again locked in place, copper strips 64 are placed over the wire turns on each clamp bar 56, 57, and clamp tops 62, 63 are bolted in place. After the clamp tops have been securely tightened, motor 30 may be turned off.

The short exposed wire portions between the two sets of clamps (each including a clamp base and top) are then cut, and the cap screws 60 holding clamp bases 56, 57 in place in slot 54 are removed.

When the clamps and wire have been removed from roll 10, the result is a wire pack including a plurality of wires (typically about 250 wires) of the same length (about 15 in.) and spaced exactly 1/64 in. from each other, tightly held by and extending between the sets of clamps. The wire pack may then be mounted in a cutting machine and the wires tensioned in the usual manner.

OTHER EMBODIMENTS

Metal strip 64 is unnecessary when the copper or other soft cladding of wire 22 is itself sufficiently deformable to insure the necessary positive grip between the wire and clamps. Similarly, the roll 10 on which the wire 22 is wrapped does not necessarily have to be cylindrical or threaded, especially if close wire spacing is used. If, for example, a wire alignment fixture is provided adjacent clamp base 56, 57 (e.g., between or at one side of the clamps) to position the wire as it crosses over the clamp bases, or the clamp bases themselves are slotted for alignment, threads 52 may be omitted and a smooth cylindrical roll used. In any event, the wire 22 may be purchased already charged with abrasive, charged after mounting in the cutting machine in the manner disclosed in U.S. Pat. No. 4,092,972, or used in a three-body cutting process as also described in said patent.

Other embodiments will be within the scope of the following claims.

I claim:

1. A system for forming a wire pack including plurality of wires of equal predetermined length extending between spaced wire supports, said system comprising:
    a cylindrical roll mounted for rotation about an axis;
    means spaced from said roll for supporting a source of wire to be wrapped around the exterior of said roll and exerting thereon a force in a direction away from said roll;
    a guide intermediate said source and said roll for locating wire from said source relative to said roll;
    a pair of said wire supports arranged to be mounted on said roll in respective positions adjacent but circumferentially spaced from each other and extending axially of said roll in position for engaging wire wrapped around said roll; and
    means for engaging wire wrapped around said roll and positioning adjacent turns at regular intervals relative to each other,
    said roll including an axially-extending recess in the periphery thereof, and said supports being adapted to be mounted in said recess.

2. The system of claim 1 wherein each of said supports includes a base adapted to be mounted in said recess with the upper surface of said base substantially aligned with the intersection of the exterior surface of said roll with said side.

3. The system of claim 1 including means for translating said roll axially relative to said guide during rotation of said roll to maintain the path of wire from said guide to said roll substantially constant.

4. The system of claim 3 wherein said means for translating moves said roll axially a distance equal to a said regular interval per complete rotation of said roll.

5. The system of claim 1 wherein said means for supporting comprises a shaft for receiving a spool of wire, a drive for rotating said shaft, and a slip clutch assembly for permitting said spool to rotate relative to said shaft in a direction opposite the direction of rotation of said shaft while exerting on said spool a force tending to rotate said spool with said shaft.

6. The system of claim 1 wherein said means for engaging includes a plurality of regularly spaced recesses in the surface of said roll arranged spirally on the roll to receive and locate respective turns of said wire.

7. The system of claim 6 wherein the exterior of said roll is threaded, and said recesses comprise said threads.

8. The system of claim 7 wherein the pitch of said threads is less than about 0.02 in.

9. The system of claim 1 including means for locating said supports axially relative to said roll and fixing clamps onto said supports relative to said roll.

10. The system of claim 1 wherein said roll is cylindrical.

11. A system for forming a wire pack including plurality of wires of predetermined length, said system comprising:
    a roll mounted for rotation about an axis;
    means spaced from said roll for supporting a source of wire to be wrapped around the exterior of said roll and exerting thereon a force in a direction away from said roll;
    a pair of wire supports arranged to be mounted in respective positions spaced from each other and extending axially of said roll in position to engage wire wrapped around said roll; and;
    means for engaging wire wrapped around said roll and positioning adjacent turns at regular intervals relative to each other;
    said roll including an axially-extending recess in the periphery thereof,
    said supports being adapted to be mounted in said recess,
    each of said supports including a base adapted to be mounted in said recess with the upper surface of said base substantially aligned with the intersection of the exterior surface of said roll with said side, and
    each of said supports including a cover adapted to overlie the base thereof and means for attaching the cover and base thereof together tightly to clamp turns of wire therebetween.

12. The system of claim 11 wherein each of said bases is longer than the cover therefor, and each of said supports includes a first set of fasteners for attaching the cover thereof to the base thereof in a position leaving the opposite ends of the base thereof uncovered and a second set of fasteners extending through the exposed ends of the base thereof for securing the support to said roll.

* * * * *